United States Patent
Furukawa et al.

(10) Patent No.: US 8,847,581 B2
(45) Date of Patent: Sep. 30, 2014

(54) OPERATION INPUT APPARATUS AND OPERATING APPARATUS

(75) Inventors: Kenichi Furukawa, Tokyo (JP); Kensuke Yamada, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 636 days.

(21) Appl. No.: 13/173,031

(22) Filed: Jun. 30, 2011

(65) Prior Publication Data

US 2012/0313627 A1    Dec. 13, 2012

(30) Foreign Application Priority Data

Jun. 7, 2011    (JP) .................................. 2011-127321

(51) Int. Cl.
*G01B 7/14* (2006.01)
*G06F 3/0338* (2013.01)

(52) U.S. Cl.
CPC .................................. *G06F 3/0338* (2013.01)
USPC ................... 324/207.11; 324/207.15

(58) Field of Classification Search
CPC ...... G01B 7/14; G01B 7/003; G01B 11/2522; G06F 3/0338
USPC ..................................................... 324/207.15
See application file for complete search history.

(56) References Cited

U.S. PATENT DOCUMENTS

2004/0252104 A1*  12/2004  Nakamura et al. ............. 345/160
2006/0250377 A1*  11/2006  Zadesky et al. ................ 345/173
2011/0234210 A1*   9/2011  Hayashi et al. .......... 324/207.15

FOREIGN PATENT DOCUMENTS

| JP | 4295559 | 7/2009 |
| JP | 2011-003536 | 1/2011 |
| WO | WO2010/134558 | 11/2010 |

\* cited by examiner

*Primary Examiner* — Arleen M Vazquez
*Assistant Examiner* — Son Le
(74) *Attorney, Agent, or Firm* — IPUSA, PLLC

(57) ABSTRACT

An operation input apparatus includes an operating unit that is displaced by the action of an operation input; an actuator output shaft that is displaced in the same direction as the operating unit by the action of the operation input; an actuator that moves the operating unit via the actuator output shaft; and a detecting element that outputs a signal corresponding to an amount of displacement of the operating unit.

14 Claims, 17 Drawing Sheets

OPERATION INPUT APPARATUS AND OPERATING APPARATUS

FIELD

The present invention relates to an operation input apparatus including an operating unit that is displaced by an operation inputting action, and an operating apparatus.

BACKGROUND

An operation input apparatus is known that includes an operating unit that can be tilted in any direction in a plane and plural coils. In this apparatus, the inductance of the coils is varied depending on the distance between the coils and the operating unit as the operating unit is tilted by an operation inputting action. By evaluating the change in inductance, the amount of tilt of the operating unit is detected (see Japanese Laid-open Patent Publication No 2011-003536, for example).

However, in the above related art, an operator operating the operating unit cannot be forcibly supplied with a stimulus that affects his or her sense of touch from the apparatus side.

SUMMARY

In one aspect of the present invention, an operation input apparatus includes an operating unit configured to be displaced by the action of an operation input; an actuator output shaft configured to be displaced in the same direction as the operating unit by the action of the operation input; an actuator configured to move the operating unit via the actuator output shaft; and a detecting element configured to output a signal corresponding to an amount of displacement of the operating unit.

In another aspect, an operating apparatus includes the operation input apparatus; and a control circuit configured to control the actuator.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DESCRIPTION OF EMBODIMENTS

In the following, embodiments of the present invention are described with reference to the attached drawings. An operation input apparatus and an operating apparatus according to an embodiment provide an operation interface that receives force provided by a finger and the like of an operator via an operating unit, where the force is input from a positive Z coordinate direction in an orthogonal coordinate system defined by X, Y, and Z axes. The operation input apparatus or the operating apparatus outputs an output signal that is varied depending on the force received, and an operation input made by the operator is detected based on the output signal. The detection of the operation input enables a computer to recognize an operation content corresponding to the detected operation input.

The operation input apparatus or the operating apparatus may be mounted in or connected to various electronic devices, such as game machines, remote controllers for operating a television, portable terminals such as cellular phones and music players, personal computers, vehicle-control computers, and electric appliances. An object (such as a cursor, a pointer, or a character) displayed on a screen of a display mounted in or connected to such electronic devices may be moved in accordance with the operation content intended by the operator. Further, the operator may enter a predetermined operation input in order to activate a desired function of the electronic device corresponding to the operation input.

The operation input apparatus or the operating apparatus may be mounted in a vehicle. For example, the operation input apparatus or the operating apparatus is installed at a location in the interior of the vehicle, such as on the steering wheel, an instrument panel, a dashboard, or a center console. In this case, the operation input apparatus or the operating apparatus may be capable of moving a displayed object on a screen of a display mounted on the vehicle. When the operation input apparatus or the operating apparatus is installed on the steering wheel, the driver may be able to operate the operating unit while holding the steering wheel and minimizing the need to move his or her line of sight forward of the vehicle.

The operation input apparatus or the operating apparatus may include a vibration generating source for moving the operating unit from the apparatus side so that a tactile or sense stimulus can be forcibly provided to the operator operating the operating unit.

Figure 1:
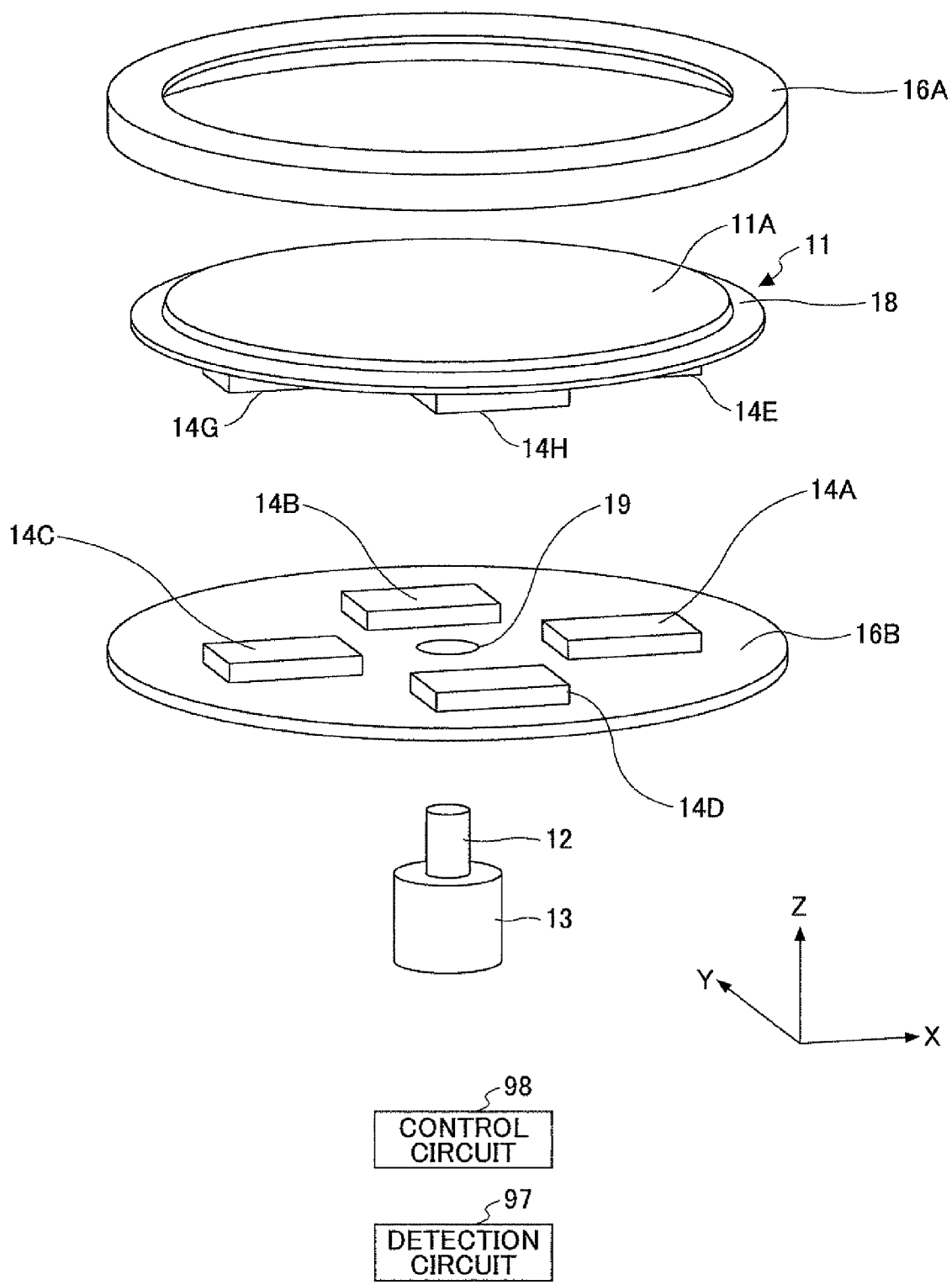
FIG. 1 is an exploded perspective view of an operation input apparatus according to an embodiment of the present invention.
Figure 2:
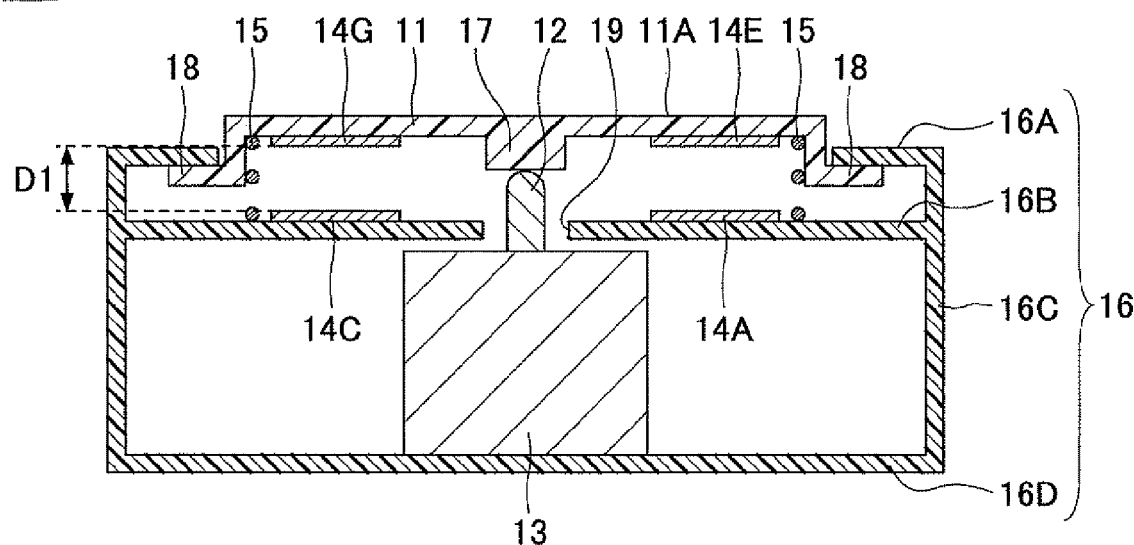
FIG. 2 is an elevational cross-section of the operation input apparatus in which an operating unit is in an initial position status.
Figure 3:
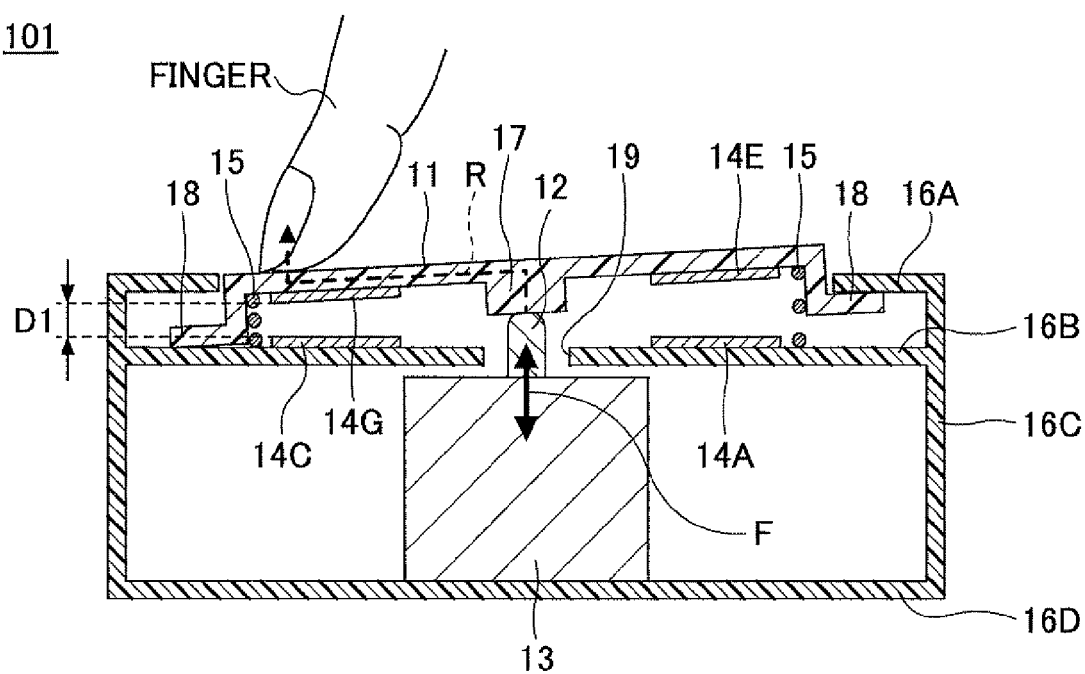
FIG. 3 is an elevational cross-section of the operation input apparatus in which the operating unit is in a tilted status.

FIG. 1 is an exploded perspective view of an operation input apparatus 101 according to an embodiment. FIG. 2 is an elevational cross-section of the operation input apparatus 101 in a non-operated status in which no operation input is acting on an operating unit 11. FIG. 3 is an elevational cross-section of the operation input apparatus 101 in a tilted status in which an operation input is being applied such that the operating unit 11 is tilted toward a detecting element 14C with respect to an X-Y plane. An entire depiction of the operation input apparatus 101 is omitted as it is substantially symmetrical with respect to the illustrated cross section. The same applies to the other operation input apparatuses to be described later.

The operation input apparatus 101 includes an operating unit 11, an actuator output shaft (which may be hereafter referred to as "the output shaft") 12, an actuator 13, and detecting elements 14A through 14H. The operating unit 11 is an operating member that may be displaced in a downwardly tilted manner by an operation input acting on an operating plane 11A directly or indirectly. The output shaft 12 is an actuator shaft that may be displaced in the same direction as the operating unit 11 by an operation input acting on the operating plane of the operating unit 11. The actuator 13 includes a vibration generating source for moving the operating unit 11 by driving the output shaft 12. The detecting elements 14A through 14H are disposed such that their mutual positional relationships can be changed by the displacement of the operating unit 11. The detecting elements 14A through 14H output a signal waveform depending on a change in their positional relationships which corresponds to the amount of displacement of the operating unit 11. Thus, by detecting the signal waveform, the amount of displacement (operation amount) and a tilt direction of the operating unit 11 can be calculated.

The operation input apparatus 101 having the above-described structure can provide one or more reciprocations of vibration to the operating unit 11 via the output shaft 12. Thus, the operator operating the operating unit 11 can be forcibly provided with a stimulus that affects the operator's sense of touch from the side of the operation input apparatus 101.

An operating apparatus including the operation input apparatus 101 may include a control circuit 98 (see FIG. 1). The control circuit 98 outputs a signal for controlling the actuator 13 that drives the output shaft 12 by which the operating unit 11 is moved. The operating apparatus including the operation input apparatus 101 may also include a detection circuit 97 (see FIG. 1). The detection circuit 97 outputs a signal corresponding to the amount of displacement of the operating unit 11 based on the signal waveform output from some or all of the detecting elements 14A through 14H.

For example, when the detecting elements 14A through 14D are coils and the detecting elements 14E through 14H are yoke members, the detection circuit 97 outputs a detection signal corresponding to a continuously changing analog amount of displacement of the operating unit 11 by electrically detecting a change in the inductance of the detecting elements 14A through 14D. Alternatively, when the detecting elements 14A through 14D are yoke members and the detecting elements 14E through 14H are coils, the detection circuit 97 may output a detection signal corresponding to a continuously changing analog amount of displacement of the operating unit 11 by electrically detecting a change in the inductance of the detecting elements 14E through 14H.

For example, the detection circuit 97 detects a physical quantity that is changed equivalent to the change in the inductance of the coils, and then outputs a detected value of the physical quantity as an equivalent value to the displacement amount of the operating unit 11. Preferably, the detection circuit 97 may calculate the inductance of the coils by detecting a physical quantity that is changed equivalent to the change in the inductance of the coils, and then output a calculated value of the inductance as an equivalent value to the displacement amount of the operating unit 11. Further preferably, the detection circuit 97 may calculate a displacement amount of the operating unit 11 based on the detected value of the physical quantity or the calculated value of the inductance, and then output a calculated value of the displacement amount.

Specifically, the detecting circuit 97 may supply a pulse signal to the coils in order to produce a signal waveform in the coils that is changed in accordance with the magnitude of the inductance of the coils, and then electrically detect a change in the inductance of the coils based on the signal waveform.

For example, as the distance between a coil and the operating unit 11 becomes smaller in an axial direction of the coil, the permeability around the coil increases, resulting in an increase in the coil inductance. As the coil inductance increases, the amplitude of a pulse voltage waveform across the coil due to the supply of the pulse signal increases. Thus, by detecting the amplitude as the physical quantity that is changed equivalent to the change in the coil inductance, the detection circuit 97 can output a detected value of the amplitude as the equivalent value to the displacement amount of the operating unit 11. Preferably, the detection circuit 97 may calculate the coil inductance based on the detected value of the amplitude, and then output a calculated value of the inductance as the equivalent value to the displacement amount of the operating unit 11.

As the coil inductance increases, the slope of the waveform of the pulse current that flows through the coil due to the supply of the pulse signal decreases. Thus, the slope may be used as the physical quantity that is varied equivalent to the change in the coil inductance. In this case, the detection circuit 97 may detect the slope and output a detected value of the slope as the equivalent value to the displacement amount of the operating unit 11. Preferably, the detection circuit 97 may calculate a coil inductance based on the detected value of the slope and output a calculated value of the inductance as the equivalent value to the displacement amount of the operating unit 11.

The detection circuit 97 may include a detecting unit that detects a change in the coil inductance by supplying a pulse signal to the coils. For example, the detection circuit 97 detects the change in the inductance of a coil based on a pulse voltage produced across the coil by the supply of a pulse current corresponding to the pulse signal to the coil. Then, the displacement amount of the operating unit 11 may be calculated based on the result of detection of the change in coil inductance.

Next, various embodiments of the operation input apparatus are described.

The operation input apparatus 101 provides a multi-directional input apparatus including the operating unit 11 as a direction key. The operating unit 11 is configured such that the amount of displacement of the operating unit 11 from an opening portion of a lid portion 16A of a casing 16 toward the inside of the casing 16 can be continuously changed depending on the amount of operation input acting on the operating plane 11A. The casing 16 includes the lid portion 16A, a dividing portion 16B, a side-wall portion 16C, and a bottom portion 16D, forming a cylindrical shape. The casing 16 includes two internal chambers divided by the dividing portion 16B. In the upper internal chamber, the operating unit 11, the detecting elements 14A through 14H, and a return spring 15 are disposed. In the lower internal chamber, the actuator 13 is disposed. The output shaft 12 of the actuator 13 penetrates an opening 19 formed at the center of the dividing portion 16B.

At the center on a lower surface of the operating unit 11, a pusher 17 is integrally formed with the operating unit 11 in such a manner as to protrude opposite the tip of the output shaft 12. The actuator 13 produces a feedback force F in an up-down direction as illustrated in FIG. 3. The feedback force F is transmitted to the operating unit 11 by the output shaft 12 contacting the pusher 17. The feedback force F is transmitted to the finger of the operator placed on the operating surface 11A of the operating unit 11 as a vibration via a transmission path R. The output shaft 12 may transmit the vibration to the pusher 17 of the operating unit 11 either directly or indirectly via another member, such as a buffer material. The buffer material may reduce shock or wear upon contact.

The operation input apparatus 101 has a structure such that the operating unit 11 can be tilted when the operating unit 11 is pressed down in an arbitrary direction. The operating unit 11 may be tilted on a fulcrum at the point of contact between the flange portion 18 of the operating unit 11 and a ceiling surface of the lid portion 16A of the casing 16, as illustrated in FIG. 3.

The operation input apparatus 101 may include the return spring 15 as an elastic member for biasing the operating unit 11 upward so that the flange portion 18 of the operating unit 11 can abut an upper member, which is the lid portion 16A of the casing 16 in the illustrated example. The casing 16 may be part of an apparatus in which the operation input apparatus 101 is mounted. The elastic member provides force by which the operating unit 11 can be returned to an initial status position where no operation input is acting. Examples of the return spring 15 may include a coil spring, a plate spring, and a spring of other shapes. The elastic member is not limited to springs and may include but is not limited to a rubber member, a sponge member, or a cylinder filled with air or oil.

When the operating unit 11 is pressed down in an arbitrary direction, the pusher 17 displaces the output shaft 12 in the same direction as the direction in which the operating unit 11 is pressed down. The actuator 13 can transmit vibration to the operator via the operating unit 11 by producing force of the opposite direction to or the same direction as the displacement of the pusher 17 in the output shaft 12.

The detecting elements 14A through 14H are configured to detect the direction or amount of pressing based on a change in their mutual distance caused by the pressing of the operating unit 11 in an arbitrary direction. The operation input apparatus 101 may include plural of such detecting elements. The detecting elements 14A through 14O may be fixed onto the dividing portion 16B of the casing 16, while the detecting elements 14E through 14H may be fixed onto the operating unit 11.

Figure 4:
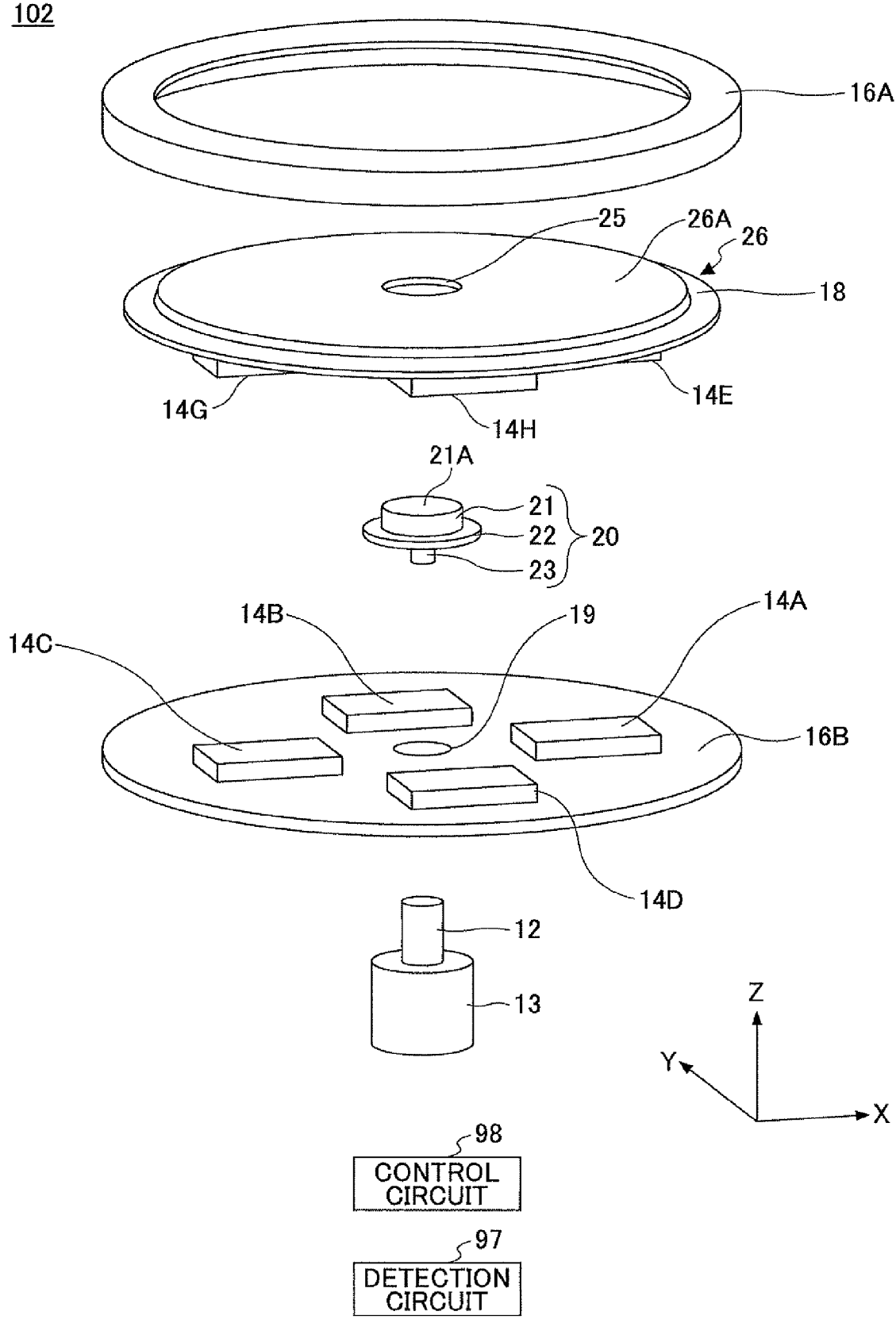
FIG. 4 is an exploded perspective view of an operation input apparatus according to another embodiment.
Figure 5:
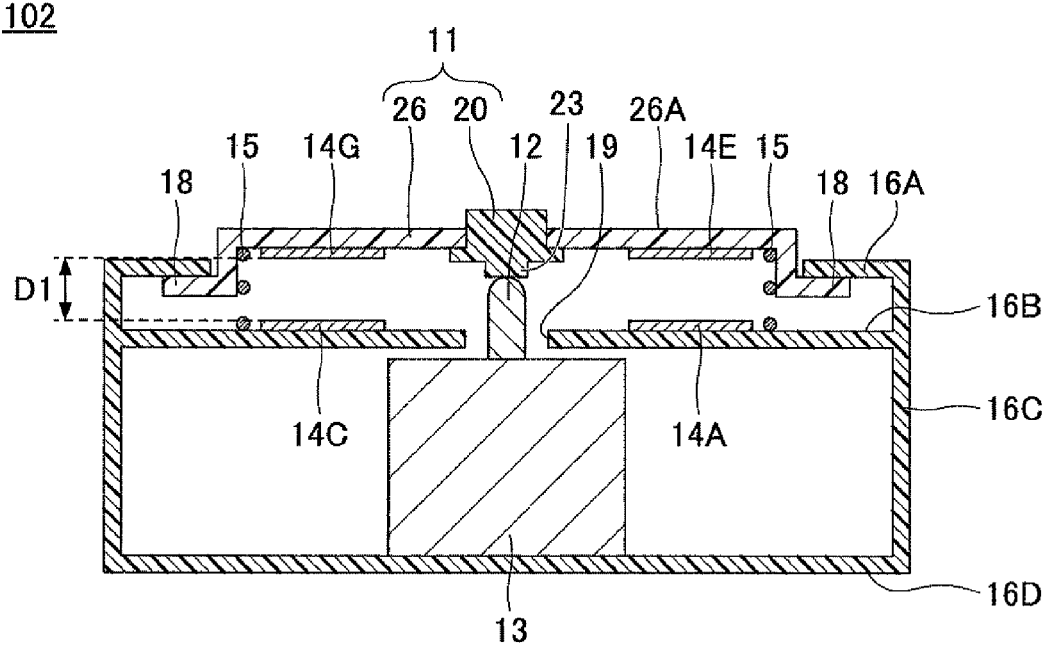
FIG. 5 is an elevational cross-section of the operation input apparatus of FIG. 4.

FIG. 4 is an exploded perspective view of an operation input apparatus 102 according to another embodiment. FIG. 5 is an elevational cross-section of the operation input apparatus 102 in a non-operated status in which no operation input is acting on the operating unit 11. Description of structures or effects similar to those of the operation input apparatus of the foregoing embodiment is omitted. The same applies to the operation input apparatuses to be described later.

The operating unit 11 includes a finalizing key 20 disposed as a center button of the operating unit 11, and a direction key 26 surrounding the finalizing key 20. The operation input apparatus 102 is structured such that the finalizing key 20 is tilted together with the direction key 26 when an operation input acts on the direction key 26 pressing down the direction key 26 in an arbitrary direction. Further, the operation input apparatus 102 is structured such that only the finalizing key 20 is pressed down when an operation input from the operator acts on the finalizing key 20 without acting on the direction key 26. At the center on a lower part of the finalizing key 20, a pusher 23 for receiving the output shaft 12 is formed. In the operation input apparatus 102, the finalizing key 20 can be operated as a button independently from the direction key 26, and the feedback force can be transmitted not just to the direction key 26 but also to the finalizing key 20.

The finalizing key 20 is a pressing portion including a body portion 21 having an operating surface 21A exposed above an upper surface (operating surface 26A) of the direction key 26. The finalizing key 20 may be positioned with respect to the left-right direction when the body portion 21 is fitted in an opening 25 formed at the center of the direction key 26. The finalizing key 20 can be displaced in the up-down direction independently.

The finalizing key 20 includes a flange portion 22 located under the direction key 26. The flange portion 22 is formed on a side surface of the body portion 21 which is columnar. The flange portion 22 forms a step portion extending from the peripheral edge of the body portion 21 of the finalizing key 20.

When the actuator 13 moves the finalizing key 20 via the output shaft 12, the flange portion 22 of the finalizing key 20 abuts the ceiling surface of the direction key 26, thus moving the direction key 26.

Figure 6:
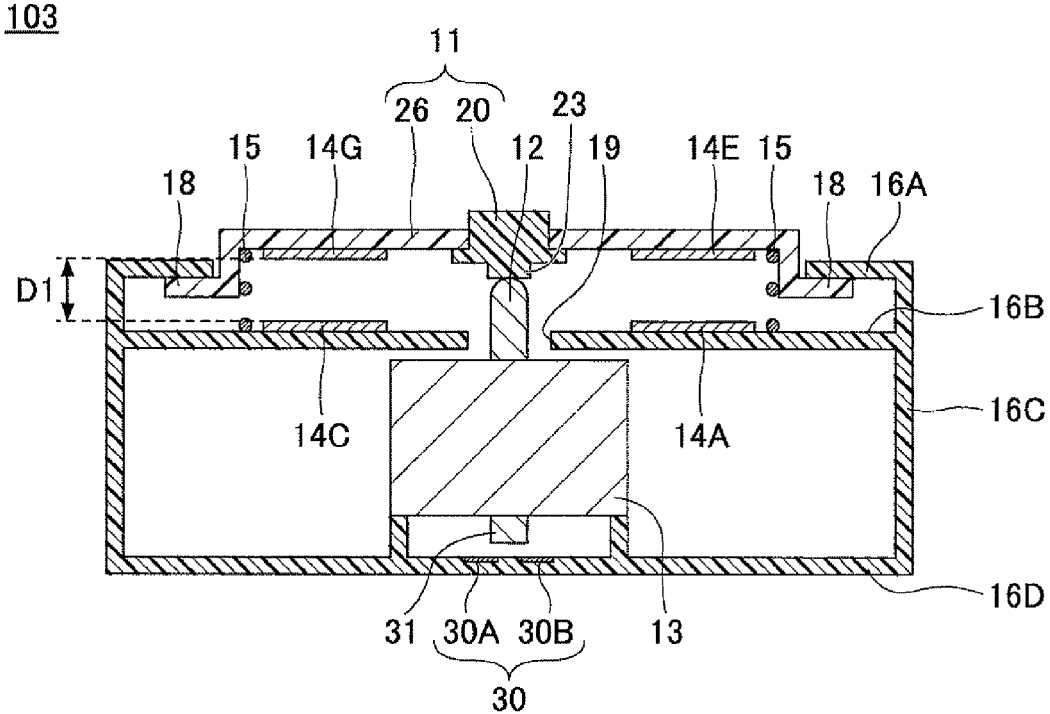
FIG. 6 is an elevational cross-section of an operation input apparatus according to another embodiment.

FIG. 6 illustrates an operation input apparatus 103 according to another embodiment, in which the output shaft 12 has a protruding portion 31 that protrudes from the bottom side of the actuator 13 opposite the operating unit 11. On the bottom portion 16D opposite the end of the protruding portion 31, an electrode 30 including at least two poles is provided. In the illustrated example of FIG. 6, when the protruding portion 31 is lowered, two electrodes 30A and 30B are short-circuited by a conductor portion of the protruding portion 31, thus enabling the detection of displacement of the output shaft 12 in accordance with the movement of the finalizing key 20. In this way, the pressing of the finalizing key 20 can be detected.

Figure 7:
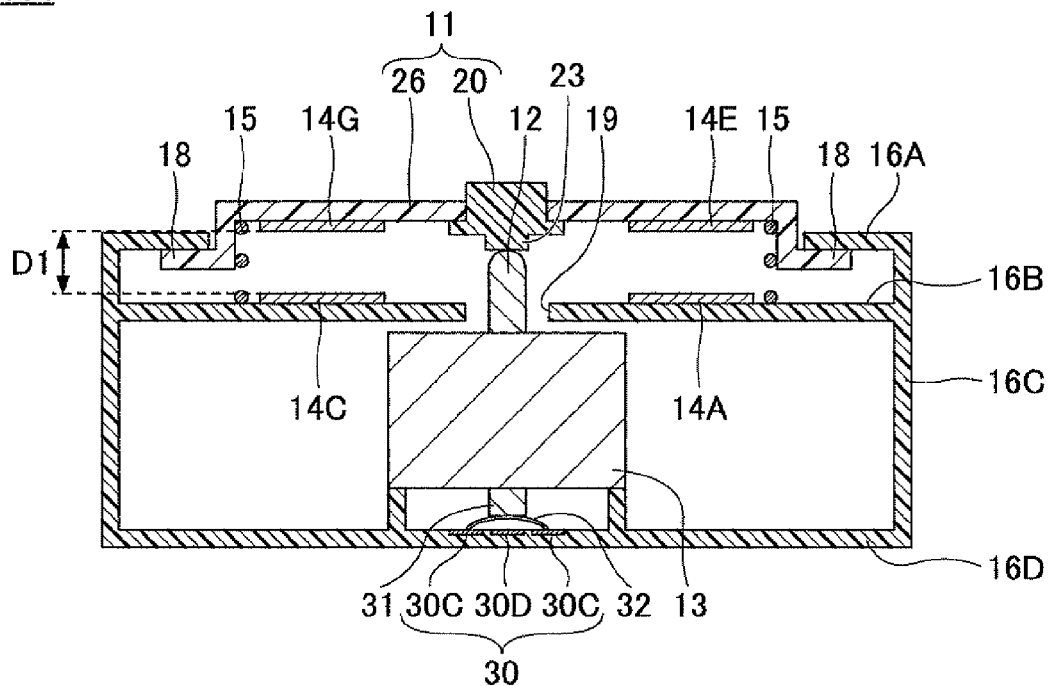
FIG. 7 is an elevational cross-section of an operation input apparatus according to another embodiment.

FIG. 7 illustrates an operation input apparatus 104 according to another embodiment in which an electrically conductive dome spring 32 is disposed on the bottom portion 16D opposite the lower end of the protruding portion 31. The dome spring 32 provides a click spring on top of which the lower end of the protruding portion 31 abuts. Deformation of the dome spring 32 imparts a sense of click to the operator operating the finalizing key 20. On the bottom portion 16D, an electrode 30D is disposed under the center of the dome spring 32, while an electrode 30C is disposed in an area corresponding to the peripheral edge of the dome spring 32. When a top portion of the dome spring 32 contacts the electrode 30D due to deformation of the dome spring 32, the electrode 30D and the electrode 30C are short-circuited by the dome spring 32, thus enabling the detection of displacement of the protruding portion 31. In this way, the pressing of the finalizing key 20 can be detected.

In FIG. 7, the finalizing key 20 may be tilted together with the direction key 26 when the direction key 26 is pressed down in an arbitrary direction. When the direction key 26 presses down the flange portion 22 of the finalizing key 20, the finalizing key 20 is displaced downward. In response to the downward displacement of the finalizing key 20, the output shaft 12 is also displaced downward, so that the dome spring 32 is deformed by the protruding portion 31 at the lower end of the output shaft 12. As the amount of deformation of the dome spring 32 is increased, the reactive force of the dome spring 32 also increases but eventually starts to decrease at some point when the sense of click is obtained. Thus, the return spring 15 supports the direction key 26 in a downwardly displaceable manner such that the amount of downward displacement of the direction key 26 reaches a structurally limited maximum value before the reactive force of the dome spring 32 starts to decrease as the amount of deformation of the dome spring 32 is increased. In this way, the operator is prevented from receiving the sense of click when pressing the direction key 26, while providing the operator with the sense of click only when the finalizing key 20 is pressed. Thus, in all of the stroke interval before the amount of downward displacement of the direction key 26 reaches the maximum value, no sense of click is provided to the operator operating the direction key 26. Thus, the operator can easily finely adjust the operation amount of the direction key 26 by controlling the force applied to the direction key 26.

Figure 8:
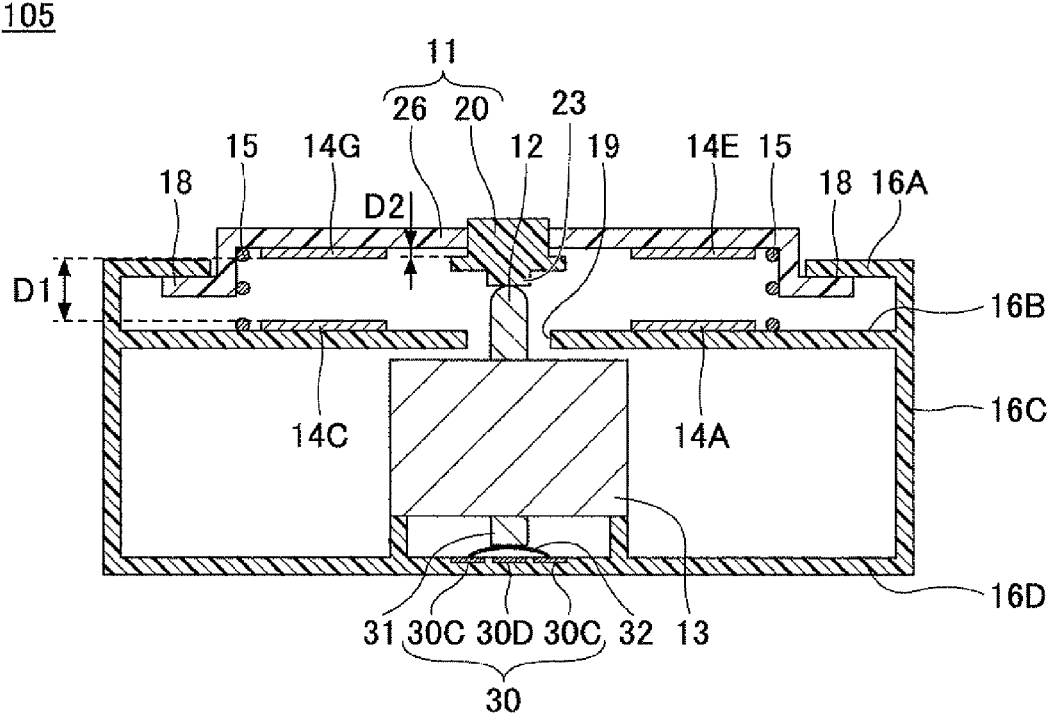
FIG. 8 is an elevational cross-section of an operation input apparatus according to another embodiment.

FIG. 8 illustrates an operation input apparatus 105 according to another embodiment in which a gap D2 is provided between the flange portion 22 of the finalizing key 20 and the ceiling surface of the direction key 26 in the pressing direction. Thus, the operator can be prevented from receiving the sense of click when the direction key 26 is pressed regardless of the displacement or the amount of displacement of the direction key 26, the finalizing key 20, or the dome spring 32, while providing the sense of click to the operator only when the finalizing key 20 is pressed. Because of the gap D2, the direction key 26 is subject to the reactive force of only the return spring 15 until the direction key 26 contacts the flange portion 22. In the stroke interval after the direction key 26 contacts the flange portion 22, the direction key 26 is subject to the reactive force from both the return spring 15 and the dome spring 32. Thus, the sense of operation of the direction key 26 can be changed during the stroke, thus improving the sense of analog input operation using the direction key 26. Specifically, because the manner in which the reactive force increases are varied during the stroke, the operator can be made aware, through the sense of touch, of the impending approach of the maximum value of the stroke amount. Further, because pressing the direction key 26 alone does not lead to the pressing of the dome spring 32 down to the position of click operation, stress in the dome spring 32 can be reduced and the dome spring 32 can last longer. By adjusting the length of the gap D2, the amount of deformation of the dome spring 32 upon tilting of the direction key 26 can be adjusted, so that the clicking position and the sense of click can be readily modified.

Figure 9:
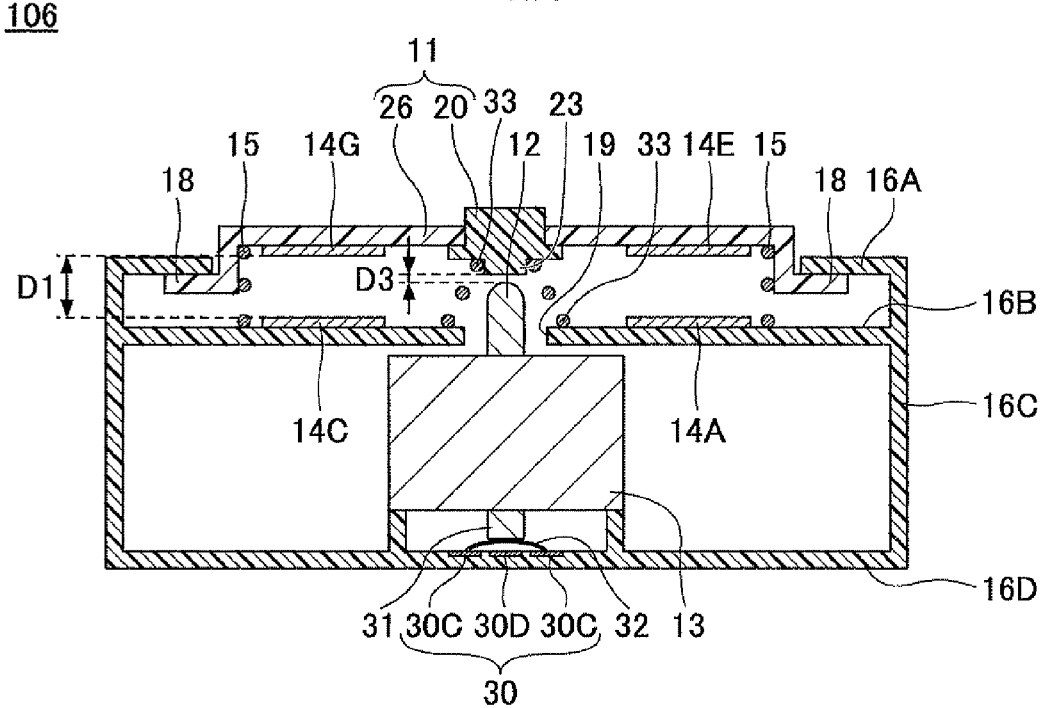
FIG. 9 is an elevational cross-section of an operation input apparatus according to another embodiment.

FIG. 9 illustrates an operation input apparatus 106 according to another embodiment in which the finalizing key 20 is provided with an upward elastic force by a pressurizing spring 33, so that a gap D3 is provided between a lower part of the finalizing key 20 and an upper end of the output shaft 12 of the actuator 13 when no operation input is being applied to the operating unit 11. Thus, the finalizing key 20 can be stably held onto the direction key 26 due to the elastic force of the pressurizing spring 33. As a result, clattering of the finalizing key 20 can be eliminated and a better sense of operation can be obtained.

Figure 10:
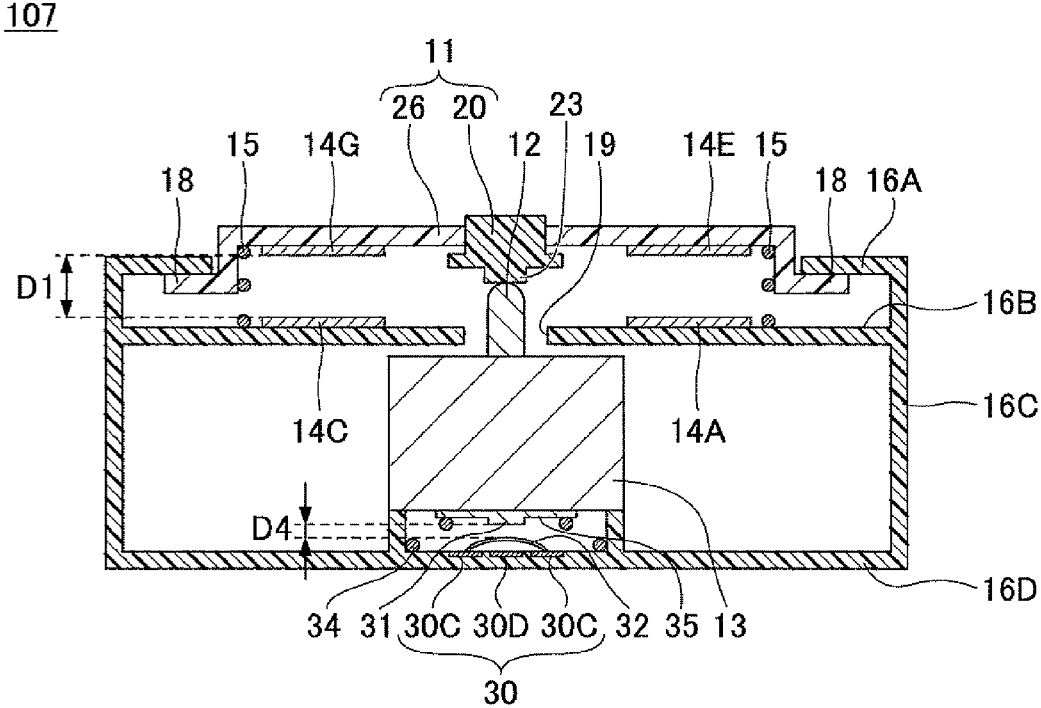
FIG. 10 is an elevational cross-section of an operation input apparatus according to another embodiment.

FIG. 10 illustrates an operation input apparatus 107 according to another embodiment in which a pressurizing spring 34 applies an upward elastic force to a flange portion 35 of the protruding portion 31 of the output shaft 12, so that a gap D4 is provided between the protruding portion 31 and the dome spring 32 when no operation input is being applied to the operating unit 11. In this way, the output shaft 12 and the finalizing key 20 can be held at positions fixed by the direction key 26, thus preventing the clattering of the finalizing key 20. By eliminating the gap between the output shaft 12 and the finalizing key 20, shock vibration or noise upon collision of the output shaft 12 against the finalizing key 20 when providing vibration to the operator can be reduced.

Figure 11A:
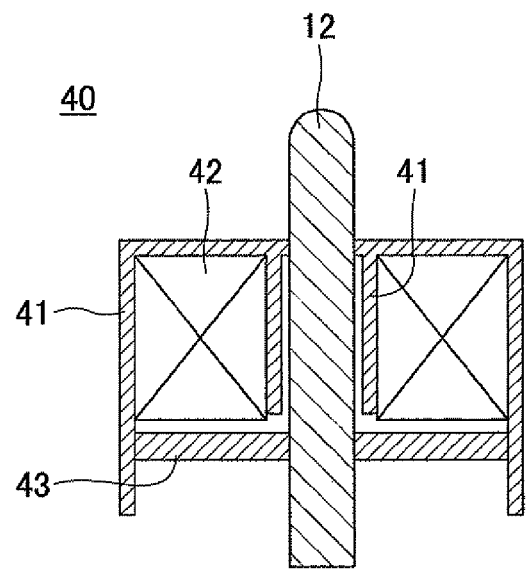
FIG. 11A is an elevational cross-section of a solenoid-type actuator in a non-activated status.
Figure 11B:
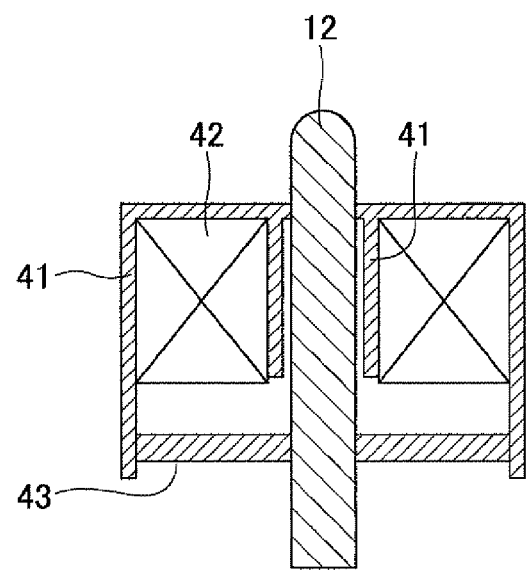
FIG. 11B is an elevational cross-section of the solenoid-type actuator in an activated status.
Figure 12:
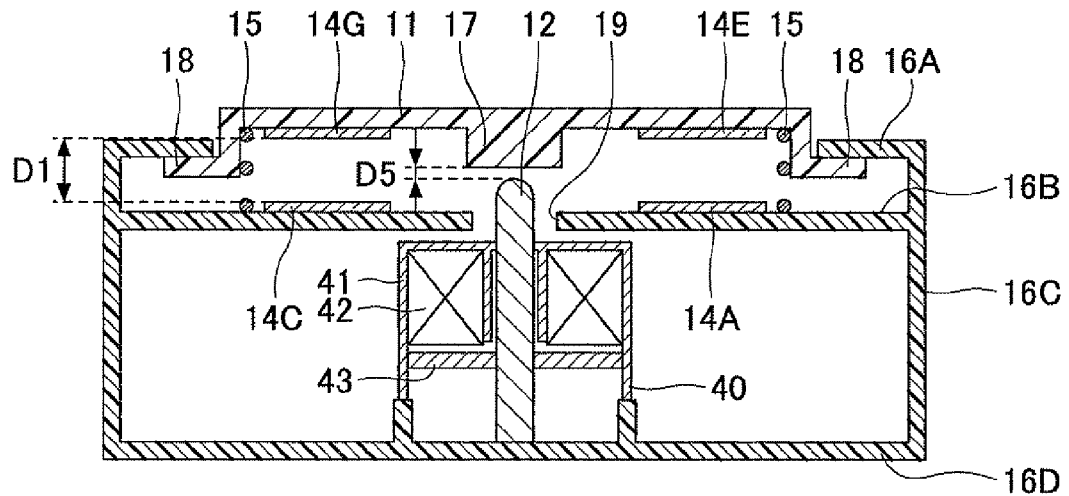
FIG. 12 is an elevational cross-section of an operation input apparatus according to another embodiment.

FIGS. 11A, 11B, and 12 illustrate a solenoid-type actuator 40 as an example of the actuator 13. The actuator 40 includes a first yoke 41 whose position is fixed, a coil 42 wound on the first yoke 41, and a second yoke 43 that is displaced integrally with the output shaft 12.

FIG. 12 illustrates an operation input apparatus 108 according to an embodiment in which the output shaft 12 of the actuator 40 is configured to move and contact a pusher 17 provided at the center on the lower side of the operating unit 11. When a current is applied to the actuator 40, a feedback force is produced in a direction opposite to the direction in which the operating unit 11 is pressed down, thus outputting vibration or force to the fingertip. In this way, vibration, shock, or the heaviness of a key operating force (reactive force) can be variably transmitted to the operator's fingertip. Further, by using the solenoid-type actuator, the feedback force can be produced and transmitted without using a permanent magnet. In addition, the possibility of degradation of the characteristics of the permanent magnet due to temperature (such as demagnetization at low temperature or decrease in coercivity at high temperature) can be eliminated.

Figure 13:
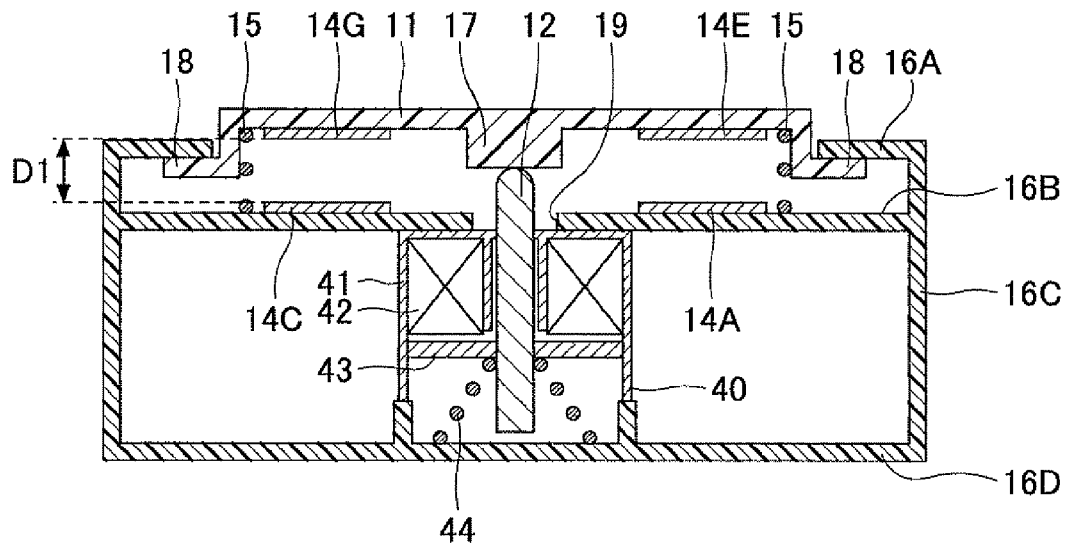
FIG. 13 is an elevational cross-section of an operation input apparatus according to another embodiment.

FIG. 13 illustrates an operation input apparatus 109 according to an embodiment in which a pressurizing spring 44 is disposed between the second yoke 43 and the bottom portion 16D to provide an elastic force in advance. The output shaft 12 is caused to contact the pusher 17 disposed at the center on the lower surface of the operating unit 11 as the second yoke 43 is pressed by the returning force of the pressurizing spring 44. Thus, the height of the output shaft 12 (displacement) can be maintained, while the output shaft 12 is moved to track the displacement of the pusher 17 caused by the tilting of the operating unit 11. Because there is no gap between the output shaft 12 and the operating unit 11 in the absence of operation input being applied to the operating unit 11, the feedback force produced by the actuator 40 can be provided to the operator from an initial position to a full-stroke position of the operating unit 11. Further, the development of shock vibration or noise, which may be caused when the output shaft 12 contacts the pusher 17, can be prevented.

Figure 14:
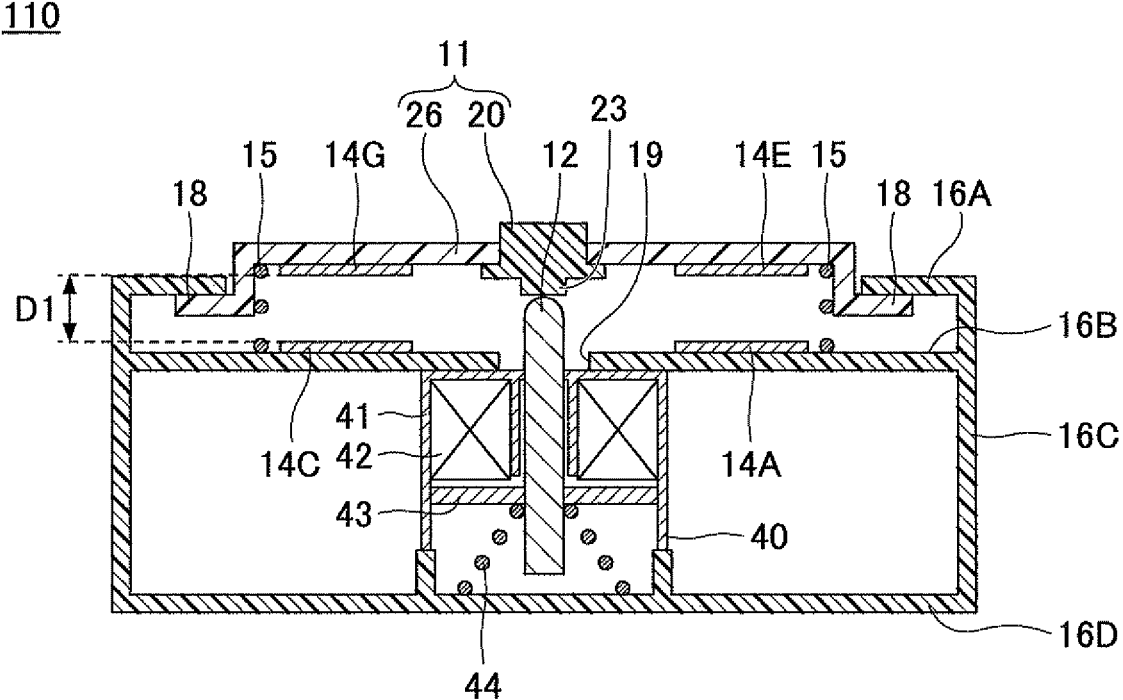
FIG. 14 is an elevational cross-section of an operation input apparatus according to another embodiment.

FIG. 14 illustrates an operation input apparatus 110 according to an embodiment which includes the finalizing key 20 that is displaced downward when the direction key 26 is pressed down. In the example of FIG. 14, the output shaft 12 of the solenoid-type actuator 40 is configured to contact the pusher 23 on the lower portion of the finalizing key 20 in advance by a spring returning force of the pressurizing spring 44. The output shaft 12 is displaced downward both when the direction key 26 is pressed and tilted and when only the finalizing key 20 is pushed. When the output shaft 12 is displaced downward, the second yoke 43 is also displaced downward, so that the gap in which a magnetic attraction force is produced within the actuator 40 is extended. As the gap is extended, the inductance of the coil 42 within the actuator 40 decreases. The amount of displacement of the output shaft 12 may be detected by the control circuit 98 or the detection circuit 97 by applying a second pulse different from the first pulse, which may be applied to the coil 42 by the control circuit 98 for producing the feedback force (see FIG. 4), as a detection pulse as needed. Namely, the operation amount (displacement amount) of the finalizing key 20 can be detected in an analog and contactless manner. The control circuit 98 or the detection circuit 97 outputs a signal corresponding to the displacement amount of the finalizing key 20 by detecting a change in the inductance of the coil 42.

Figure 15A:
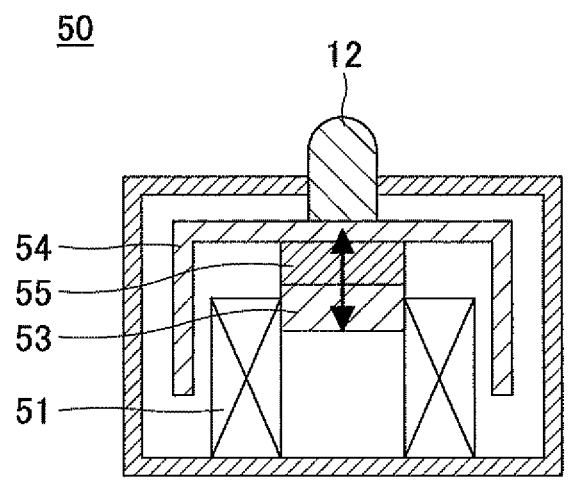
FIG. 15A is an elevational cross-section of an actuator in a non-activated status.
Figure 15B:
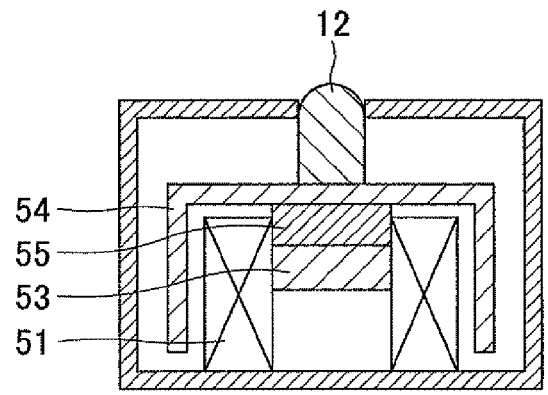
FIG. 15B is an elevational cross-section of the actuator in an activated status.
Figure 16:
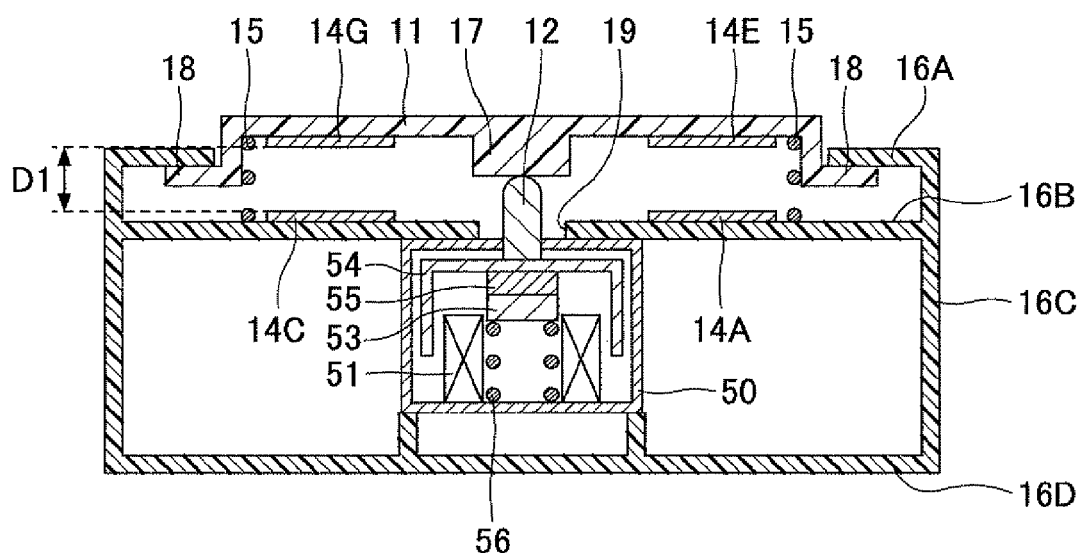
FIG. 16 is an elevational cross-section of an operation input apparatus according to another embodiment.

FIGS. 15A, 15B, and 16 illustrate an actuator 50 as a second example of the actuator 13, in which a permanent magnet 55 and a voice coil 51 are used. The positional relationship between the core 53 and the coil 51 is changed as the output shaft 12 is displaced. The yoke 54 is disposed outside the coil 51. The output shaft 12 is moved by the current that flows through the coil 51 and the magnetic flux of the permanent magnet 55. The coil 51, the core 53, and the yoke 54 are disposed such that the magnetic flux produced in the gap between the core 53 and the yoke 54 is perpendicular to an axial direction of the coil 51.

FIG. 16 illustrates an operation input apparatus 111 according to an embodiment in which the output shaft 12 of the actuator 50 is held in contact with the pusher 17 disposed at the center on the bottom portion of the operating unit 11 by a return spring 56 provided within the actuator 50. By switching the direction of current applied to the coil 51 of the actuator 50 by the control circuit 98 (see FIG. 1), a feedback force is produced in the direction in which the operating unit 11 is pushed, or in the opposite direction, thus outputting vibration or force to the operator's fingertip. Thus, vibration or the heaviness of a key operating force (reactive force) can be variably transmitted to the operator's fingertip.

Figure 17:
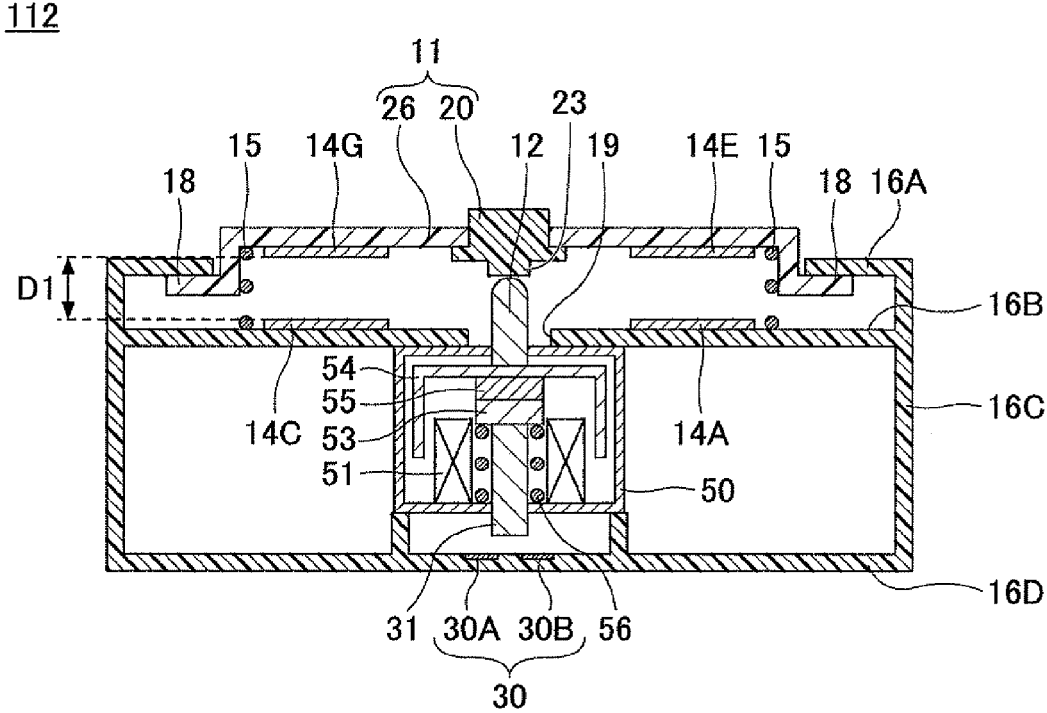
FIG. 17 is an elevational cross-section of an operation input apparatus according to another embodiment.

FIG. 17 illustrates an operation input apparatus 112 according to an embodiment in which an independent pressing of the finalizing key 20 is enabled. In order to detect the pressing of the finalizing key 20, the protruding portion 31, which is displaced in the same way as the output shaft 12, downwardly penetrates a casing of the actuator 50. The protruding portion 31 is made of an electrically conductive material or provided with a conductive surface treatment, and at least two electrodes are disposed under the protruding portion 31. In this way, the pressing of the finalizing key 20 can be detected.

Figure 18:
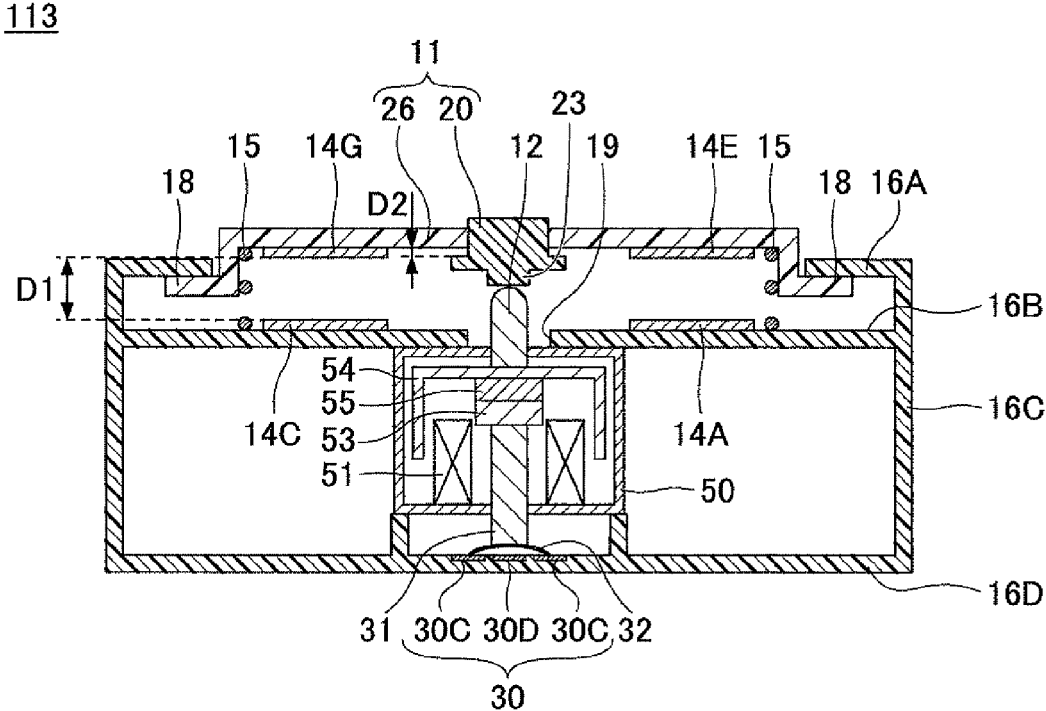
FIG. 18 is an elevational cross-section of an operation input apparatus according to another embodiment.

FIG. 18 illustrates an operation input apparatus 113 according to an embodiment in which the dome spring 32 is disposed under the protruding portion 31, and the finalizing key 20 alone is provided with the clicking function. The sense of click may be provided to only the finalizing key 20 by any of the methods described above.

Figure 19:
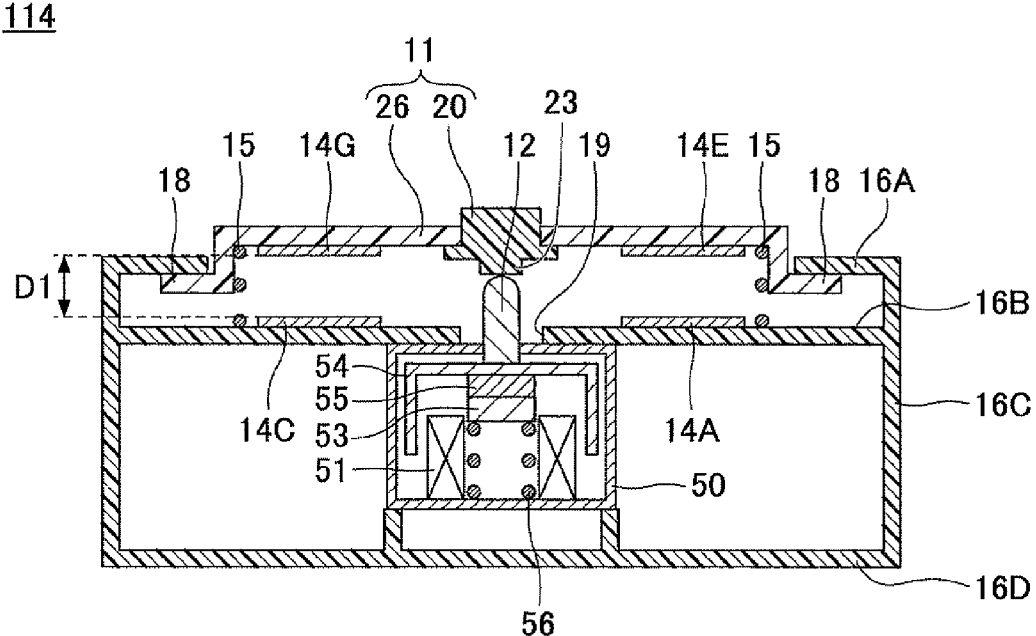
FIG. 19 is an elevational cross-section of an operation input apparatus according to another embodiment.

FIG. 19 illustrates an operation input apparatus 114 according to an embodiment. In the illustrated example, as the output shaft 12 is displaced downward by the pressing of the finalizing key 20, the positional relationship between the coil 51 and the core 53 is changed. As a result, the permeability around the coil 51 is changed and therefore the self-inductance of the coil 51 is changed. Upon application of a pulse signal, the coil 51 outputs a signal waveform corresponding to the displacement amount of the output shaft 12 (i.e., the displacement amount of the finalizing key 20) as the inductance of the coil is changed. Thus, by detecting the signal waveform, the displacement amount of the finalizing key 20 can be calculated. In the operation input apparatus 114, as the distance between the coil 51 and the core 53 is reduced, the self-inductance of the coil 51 increases. The control circuit 98 or the detection circuit 97 (see FIG. 4) outputs a signal corresponding to the displacement amount of the finalizing key 20 by detecting a change in the inductance of the coil 51.

Next, examples of the detecting element are described.

Figure 20:
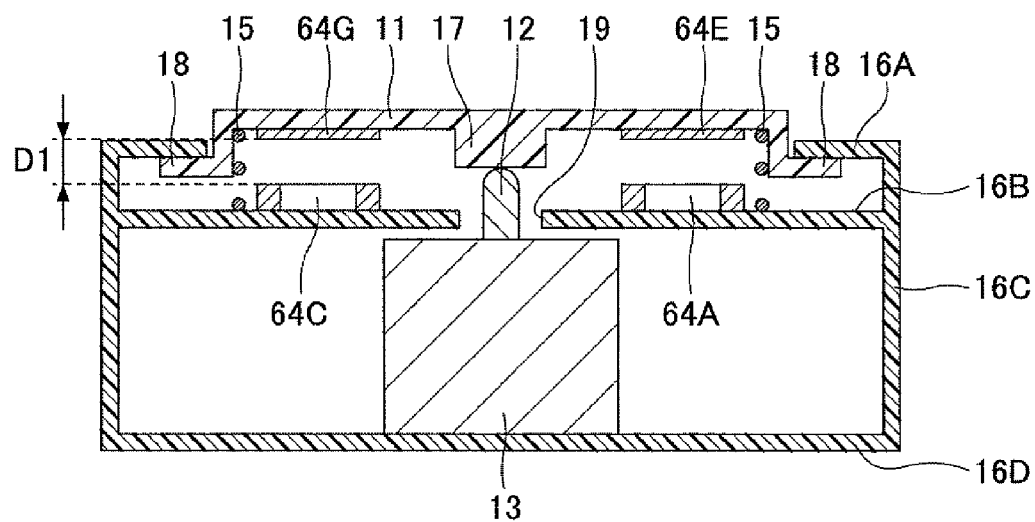
FIG. 20 is an elevational cross-section of an operation input apparatus according to another embodiment.

FIG. 20 illustrates an operation input apparatus 115 according to an embodiment in which movable yokes 64E through 64H are fixedly mounted on the lower surface of the direction key 11 such that the movable yokes 64E through 64H can be moved together with the tilting of the direction key 11. Plural coils 64A through 64D are fixed on the surface opposite the movable yokes 64E through 64H. As the distances between the movable yokes 64E through 64H and the coils 64A through 64D, respectively, are reduced, the self-inductances of the coils 64A through 64D decrease. By detecting the decreases in self-inductance, the amount and direction of pressing of the direction key 11 in an arbitrary direction can be detected. By detecting the self-inductances of the coils 64A through 64D, a change in temperature characteristics or false detection due to electromagnetic noise can be prevented.

Figure 21:
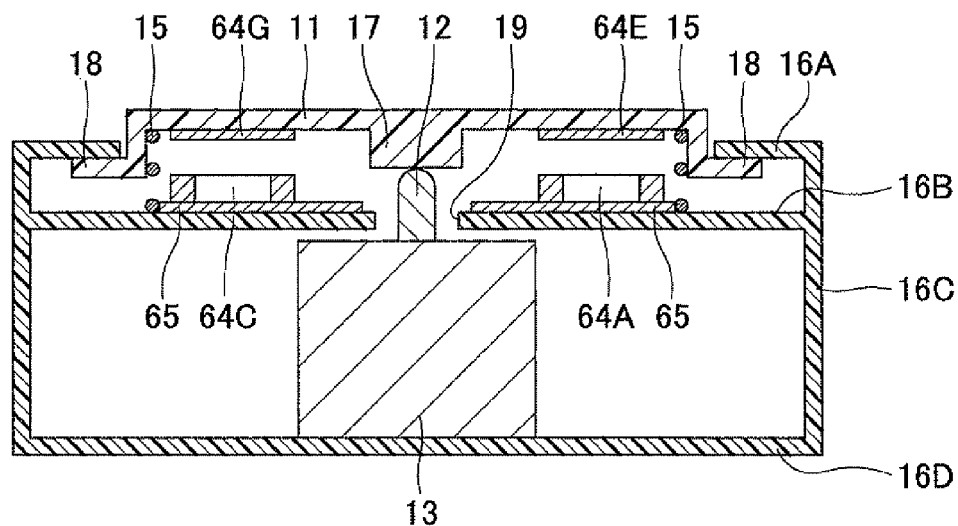
FIG. 21 is an elevational cross-section of an operation input apparatus according to another embodiment.

FIG. 21 illustrates an operation input apparatus 116 according to an embodiment in which, in order to increase the permeability around the coils 64A through 64D, a fixed yoke 65 is disposed under each of the coils 64A through 64D. In this way, the absolute value of the self-inductance of the coils 64A through 64D can be increased, thereby facilitating detection and increasing the accuracy of detection.

Figure 22:
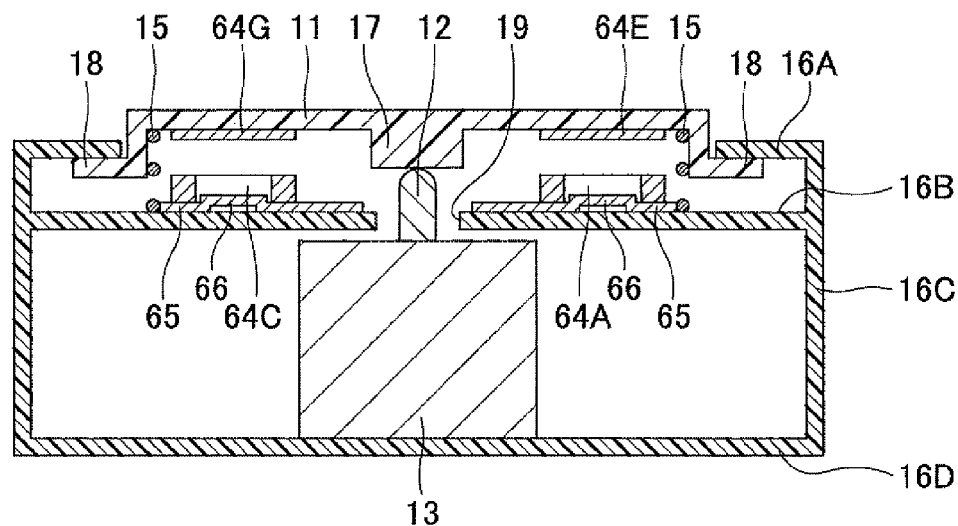
FIG. 22 is an elevational cross-section of an operation input apparatus according to another embodiment.

FIG. 22 illustrates an operation input apparatus 117 according to an embodiment in which a portion of the fixed yoke 65 corresponding to the center of the coil is partially blanked to form a core-shaped step portion 66, so that the permeability around the coil can be increased. As a result, the amount of change in the coil inductance relative to the amount of tilt of the operating unit 11 can be increased, so that the tilt amount of the operating unit 11 can be detected with an increased detection sensitivity.

Figure 23:
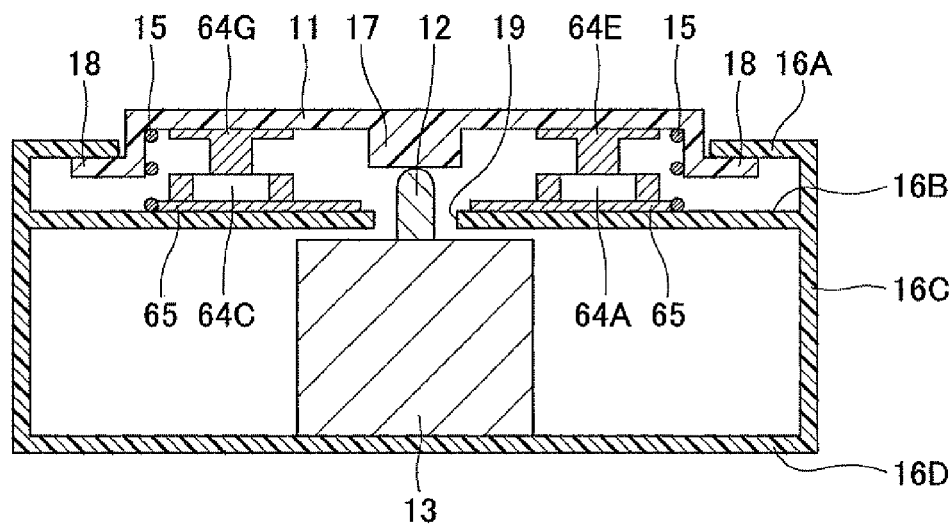
FIG. 23 is an elevational cross-section of an operation input apparatus according to another embodiment.

FIG. 23 illustrates an operation input apparatus 118 according to an embodiment in which a core-shaped portion is formed on the movable yokes 64E through 64H, which are tilted together with the operating unit 11, at a position corresponding to the center of the coil. In this way, the permeability around the coil can be increased. As a result, the amount of change in the coil inductance relative to the amount of tilt of the operating unit 11 can be increased, so that the amount of tilt of the operating unit 11 can be detected with an increased detection sensitivity.

Figure 24:
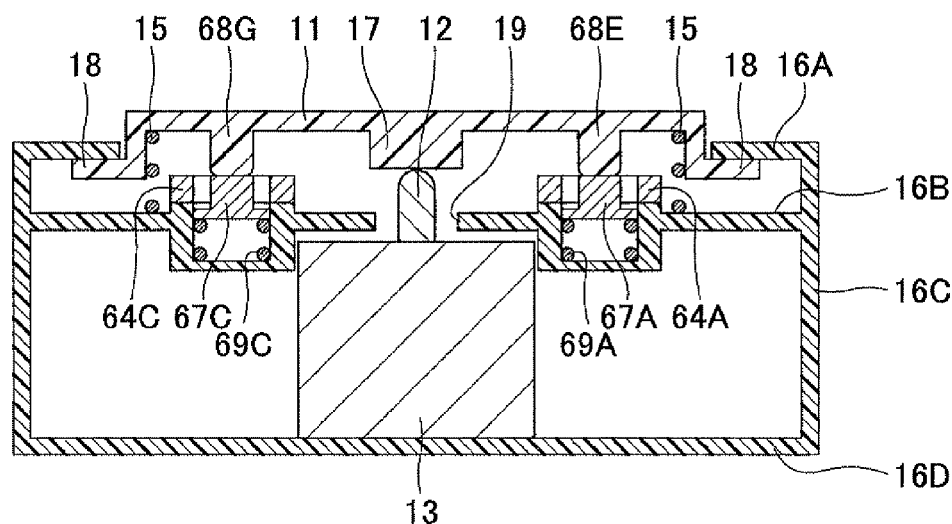
FIG. 24 is an elevational cross-section of an operation input apparatus according to another embodiment.

FIG. 24 illustrates an operation input apparatus 119 according to an embodiment in which pushers 68E through 68H are provided on the lower surface of the operating unit 11. Further, plural coils 64A through 64D are disposed opposite the pushers 68E through 68H such that the pushers 68E through 68H are positioned at substantially the center of the corresponding coils 64A through 64D. At the centers of the coils 64A through 64D, cores 67A through 67D are held in contact with the corresponding pushers 68E through 68H by corresponding return springs 69A through 69D.

When the operating unit 11 is pressed and tilted, the cores 67A through 67D are displaced downward by the pushers 68E through 68H. When the cores 67A through 67D are displaced out of the coils 64A through 64D, the self-inductances of the coils 64A through 64D are reduced. Thus, by detecting the decreases in inductance, the amount and direction of pressing of the operating unit 11 in an arbitrary direction can be detected. By detecting the self-inductances of the coils, a change in temperature characteristics or false detection due to electromagnetic noise can be prevented. At the same time, because no heavy item, such as a movable yoke, is attached to the operating unit 11, the feedback force can be transmitted to the operator's fingertip sharply and quickly.

Figure 25:
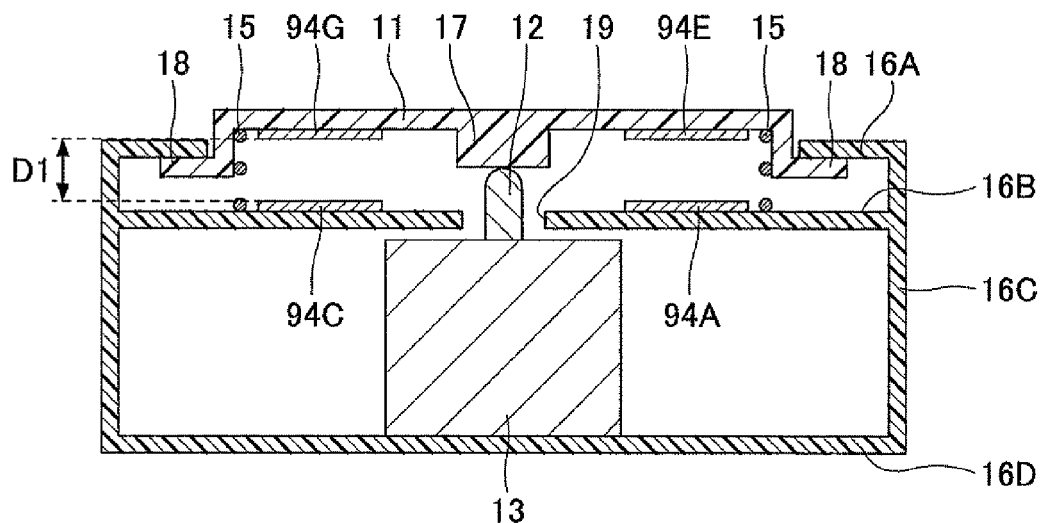
FIG. 25 is an elevational cross-section of an operation input apparatus according to another embodiment.

FIG. 25 illustrates an operation input apparatus 120 according to an embodiment in which electrodes 94E through 94H are provided on the lower surface of the operating unit 11. On the surface opposite the electrodes 94E through 94H, three or more fixed electrodes (94A through 94D in the illustrated example) are disposed. By detecting the capacitances between the electrodes 94E through 94H on the operating unit 11 and the fixed electrodes 94A through 94D, the amount and direction of pressing of the operating unit 11 in an arbitrary direction can be detected. Preferably, in order to increase the absolute value of capacitance, an elastic member having a higher permittivity than that of air, such as silicon rubber, may be disposed between the upper and lower electrodes. When the elastic member is deformed by the pressing of the operating unit 11, the distance between the upper and lower electrodes is reduced. As the distance between the upper and lower electrodes is reduced, capacitance increases. Because the electrodes can be easily formed on a substrate as a copper pattern, for example, the structure can be simplified and cost can be reduced.

Figure 26:
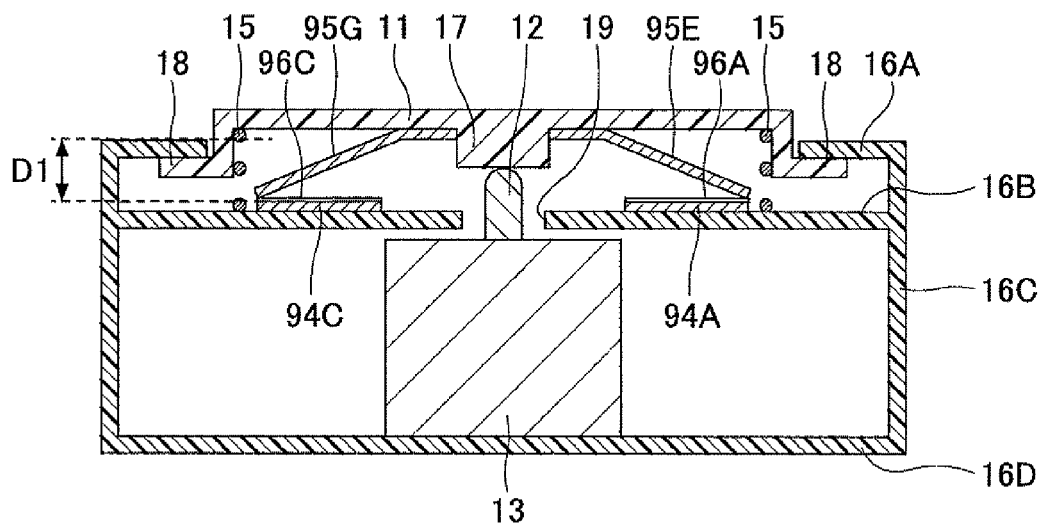
FIG. 26 is an elevational cross-section of an operation input apparatus according to another embodiment in which the operating unit is in an initial position status.
Figure 27:
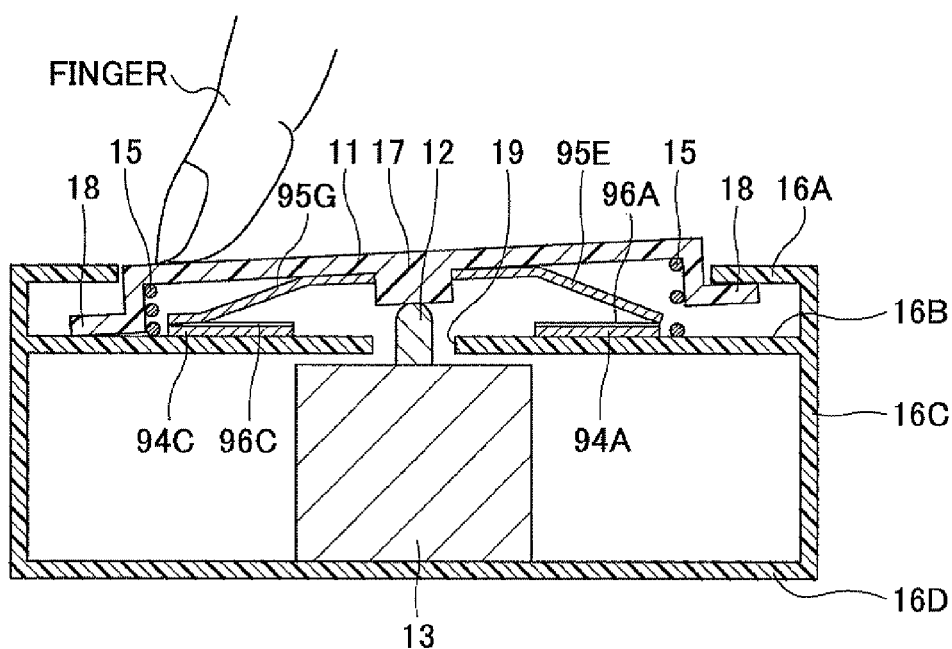
FIG. 27 is an elevational cross-section of the operation input apparatus of FIG. 26 in which the operating unit is in a tilted status.

FIG. 26 illustrates an operation input apparatus 121 according to an embodiment in which movable deforming electrodes 95E through 95H provided on the lower surface of the operating unit 11 are fixed at a central portion of the operating unit 11. The outer peripheral sides of the movable deforming electrodes 95E through 95H are disposed in the vicinity of, or in contact with, the fixed electrodes 94A through 94D. The sides of the fixed electrodes or the movable deforming electrodes on the side of the gap between the upper and lower electrodes may be coated with films 96A through 96D made of a high-permittivity material (such as barium titanate) in order to increase permittivity. As illustrated in FIG. 27, as the amount of pressing and tilt of the operating unit 11 increases, the area of contact between the outer peripheral portion of the movable deforming electrode 95G, for example, and the corresponding fixed electrode 94C, for example, increases. Because capacitance is inversely proportional to the distance between electrodes, the linearity of detection sensitivity with respect to the amount of tilt decreases when only the distance between the electrodes is changed. However, capacitance is proportional to the area of an electrode. Thus, capacitance is increased as the area of close contact between the movable deforming electrode and the fixed electrode with the high-permittivity film is interposed therebetween is increased. Thus, in accordance with the present embodiment, the linearity of detection sensitivity with respect to the tilting operation of the operating unit 11 is improved by increasing the area of close contact.

Figure 28:
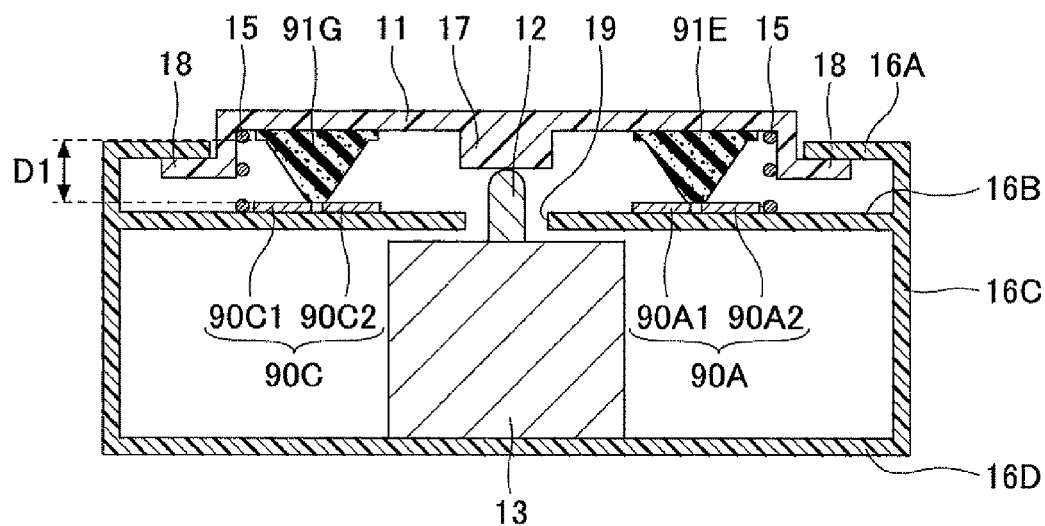
FIG. 28 is an elevational cross-section of an operation input apparatus according to another embodiment in which the operating unit is in an initial position status.
Figure 29:
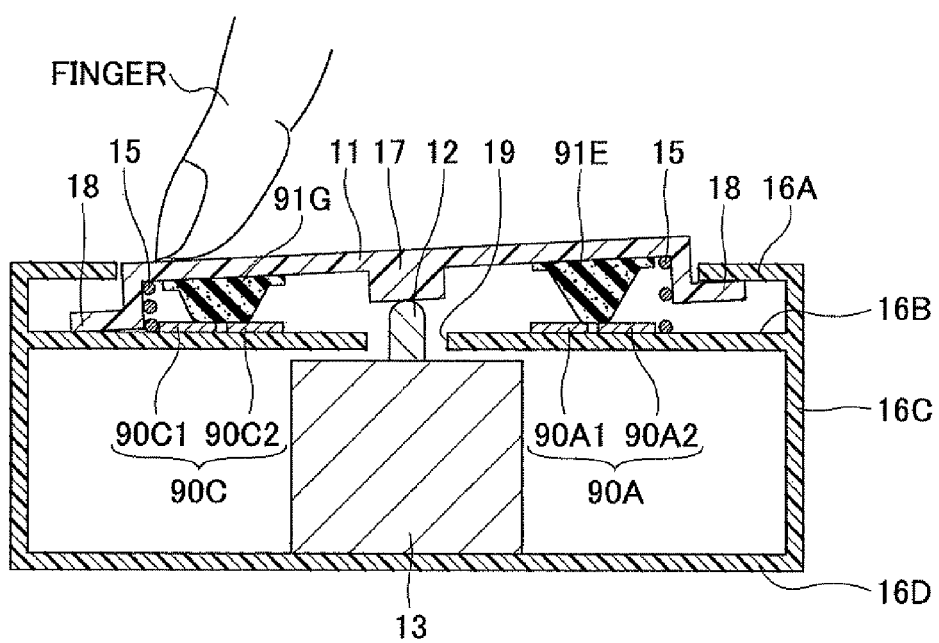
FIG. 29 is an elevational cross-section of the operation input apparatus of FIG. 28 in which the operating unit is in a tilted status.

FIG. 28 illustrates an operation input apparatus 122 according to an embodiment in which electrically conductive elastic members 91E through 91H (such as conductive rubber in which carbon is mixed) are disposed on the lower surface of the operating unit 11. The elastic members 91E through 91H have a pusher shape and are configured to deform upon contact with a fixed portion such that the area of contact with the fixed portion is increased. On the surface opposite the electrically conductive elastic members 91E through 91H, three or more fixed electrodes 90A through 90D formed of resistance film are disposed at positions corresponding to the electrically conductive elastic members 91E through 91H. As illustrated in FIG. 29, when the operating unit 11 is pressed, the electrically conductive elastic members 91E through 91H are deformed. As a result, the area or distance of contact, or the number of locations of contact, between the electrically conductive elastic members 91E through 91H and the fixed electrodes 90A through 90D increases, thereby enabling the detection of changes in the resistance values of the resistance film. By detecting the changes in the resistance values of the fixed electrodes 90A through 90D (resistance film), the amount and direction of pressing of the operating unit 11 in an arbitrary direction can be detected. Because the detection is based on a change in resistance value, the amount of displacement can be readily converted into a voltage by voltage division, compared to the detection based on a change in a physical quantity such as capacitance or inductance. Thus, the amount of displacement can be readily expressed in a value by using only an A/D converter.

Thus, in accordance with an embodiment of the present invention, the operator operating the operating unit can be forcibly provided with a stimulus that affects the operator's sense of touch from the apparatus side.

Although this invention has been described in detail with reference to certain embodiments, various modifications, improvements, and substitutions may exist within the scope and spirit of the invention as claimed in the following claims. Structures or units of the various embodiments may be combined in various manners.

The operation input apparatus according to an embodiment may be operated by the palm, or any of the fingers or the sole of a foot, instead of the finger of the operator's hand. The operating surface touched by the operator may include a flat surface, a concave surface, and a convex surface.

The present application is based on Japanese Priority Application No. 2011-127321 filed Jun. 7, 2011, the entire contents of which are hereby incorporated by reference.

What is claimed is:

1. An operation input apparatus comprising:
an operating unit configured to be displaced by the action of an operation input;
an actuator output shaft configured to be displaced in the same direction as the operating unit by the action of the operation input;
an actuator configured to move the operating unit via the actuator output shaft;
a detecting element configured to output a signal corresponding to an amount of displacement of the operating unit;
a pressing portion; and
a tilting portion surrounding the pressing portion,
wherein the actuator moves the pressing portion and the tilting portion via the actuator output shaft;

wherein the actuator output shaft includes a protruding portion penetrating a side of the actuator opposite the side of the operating unit; and wherein two electrodes are disposed at a position opposite the protruding portion and configured to be electrically connected to each other by the protruding portion in order to detect the displacement of the actuator output shaft.

2. The operation input apparatus according to claim 1, wherein the electrodes are configured to be electrically connected to each other via a dome spring configured to be deformed by the protruding portion in order to detect the displacement of the pressing portion.

3. The operation input apparatus according to claim 2, further comprising an elastic member configured to provide a gap between the protruding portion and the dome spring.

4. The operation input apparatus according to claim 1, wherein the actuator includes a first yoke, a coil, and a second yoke configured to be displaced integrally with the actuator output shaft.

5. The operation input apparatus according to claim 4, further comprising an elastic member configured to provide an elastic force to the second yoke so that force can be applied to the operating unit via the actuator output shaft in advance.

6. The operation input apparatus according to claim 1, wherein the actuator includes a first yoke, a coil, and a second yoke configured to be displaced integrally with the actuator output shaft, the operation input apparatus further comprising an elastic member configured to provide an elastic force to the second yoke so that force can be applied to the pressing portion via the actuator output shaft in advance.

7. The operation input apparatus according to claim 4, wherein the first yoke is fixedly positioned, and the coil is mounted on the first yoke.

8. The operation input apparatus according to claim 4, wherein the second yoke includes a core of the coil, wherein the coil, the first yoke, and the second yoke are disposed such that a magnetic flux generated in a gap between the first yoke and the second yoke is perpendicular to an axial direction of the coil.

9. The operation input apparatus according to claim 1, wherein the detecting element includes a coil and a yoke whose positional relationship with the coil is changed by the displacement of the operating unit, wherein the coil outputs a signal corresponding to an amount of displacement of the operating unit.

10. The operation input apparatus according to claim 1, wherein the operation input apparatus is mounted on a vehicle and is configured to move a displayed object on a display of the vehicle.

11. The operation input apparatus according to claim 10, wherein the operation input apparatus is mounted on a steering wheel of the vehicle.

12. An operating apparatus comprising:

the operation input apparatus according to claim 1; and a control circuit configured to control the actuator.

13. An operating apparatus comprising:

the operation input apparatus according to claim 1; and a detecting circuit configured to output a signal corresponding to the amount of displacement of the operating unit based on the signal output from the detecting element.

14. An operating apparatus comprising:

the operation input apparatus according to claim 6; and a detecting circuit configured to output a signal corresponding to the amount of displacement of the pressing portion by detecting a change in an inductance of the coil of the actuator.

\* \* \* \* \*